United States Patent
Allen et al.

(10) Patent No.: US 9,835,448 B2
(45) Date of Patent: Dec. 5, 2017

(54) HOLOGRAM FOR ALIGNMENT

(71) Applicant: HEWLETT-PACKARD DEVELOPMENT COMPANY, L.P., Houston, TX (US)

(72) Inventors: William J. Allen, Corvallis, OR (US); David A. Fattal, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 24 days.

(21) Appl. No.: 15/037,456

(22) PCT Filed: Nov. 29, 2013

(86) PCT No.: PCT/US2013/072480
§ 371 (c)(1),
(2) Date: May 18, 2016

(87) PCT Pub. No.: WO2015/080750
PCT Pub. Date: Jun. 4, 2015

(65) Prior Publication Data
US 2016/0305775 A1    Oct. 20, 2016

(51) Int. Cl.
*G01B 11/26* (2006.01)
*G01B 9/021* (2006.01)
(Continued)

(52) U.S. Cl.
CPC ............. *G01B 11/272* (2013.01); *G03H 1/22* (2013.01); *G03H 1/2249* (2013.01);
(Continued)

(58) Field of Classification Search
CPC ...... G01B 11/272; G03H 1/22; G03H 1/2249; G03H 1/265; G03H 2001/2273;
(Continued)

(56) References Cited

U.S. PATENT DOCUMENTS

| | | |
|---|---|---|
| 4,576,458 A | 3/1986 | Cho |
| 6,559,948 B1 | 5/2003 | Stenton |

(Continued)

FOREIGN PATENT DOCUMENTS

| | | |
|---|---|---|
| JP | 2003339657 A | 12/2003 |
| JP | 2008197574 A | 8/2008 |
| WO | WO-0202351 | 1/2002 |

OTHER PUBLICATIONS

Almeida, C.S.D.B. et al., A Proposal of a Multi-view Environment for Markerless Augmented Reality [online], Jun. 29, 2013, Retrieved from the Internet <http://www.ucsp.edu.pe/sibgrapi2013/eproceedings/wip/115208.pdf>, [retrieved on Sep. 24, 2013], 4 pages.

(Continued)

*Primary Examiner* — Hina F Ayub
(74) *Attorney, Agent, or Firm* — Dhand Law PC

(57) ABSTRACT

An example hologram device may include a target holographic view of an encoded holographic image representing an alignment target; and a plurality of non-target holographic views of the encoded holographic image, each non-target holographic view indicating a position relative to the target holographic view.

15 Claims, 6 Drawing Sheets

(51) Int. Cl.
  *G01C 1/00* (2006.01)
  *G01B 11/27* (2006.01)
  *G03H 1/22* (2006.01)
  *G06K 7/10* (2006.01)
  *G06K 7/14* (2006.01)
  *G06K 19/06* (2006.01)
  *G03H 1/26* (2006.01)

(52) U.S. Cl.
  CPC ......... *G03H 1/265* (2013.01); *G06K 7/10663* (2013.01); *G06K 7/10732* (2013.01); *G06K 7/1417* (2013.01); *G06K 19/06037* (2013.01); *G03H 2001/2273* (2013.01); *G03H 2210/30* (2013.01); *G03H 2210/53* (2013.01); *H04M 2250/52* (2013.01)

(58) Field of Classification Search
  CPC ........... G03H 2210/30; G03H 2210/53; G06K 7/10663; G06K 7/10732; G06K 7/1417; G06K 19/06037; H04M 2250/52
  USPC ....................................................... 356/138
  See application file for complete search history.

(56) References Cited

U.S. PATENT DOCUMENTS

| | | |
|---|---|---|
| 7,511,805 B2 | 3/2009 | Hinderling |
| 2005/0190680 A1 | 9/2005 | Kim |
| 2009/0257104 A1 | 10/2009 | Cable et al. |
| 2010/0045701 A1 | 2/2010 | Scott et al. |
| 2010/0208057 A1 | 8/2010 | Meier et al. |
| 2011/0001928 A1 | 1/2011 | Sayeram et al. |
| 2013/0022222 A1* | 1/2013 | Zschau ................ G03H 1/0808 381/306 |

OTHER PUBLICATIONS

Jiang, B. et al., Camera Tracking for Augmented Reality Media [online], Apr. 17, 2000, Retrieved from the Internet <http://graphics.usc.edu/cgit/publications/papers/Bolanp280.pdf> [retrieved on Sep. 24, 2013], 4 pages.

Kozacki, T. et al., Holographic Capture and Display Systems in Circular Configurations, Journal of Display Technology, Apr. 2012, vol. 8, No. 4, pp. 225-232.

\* cited by examiner

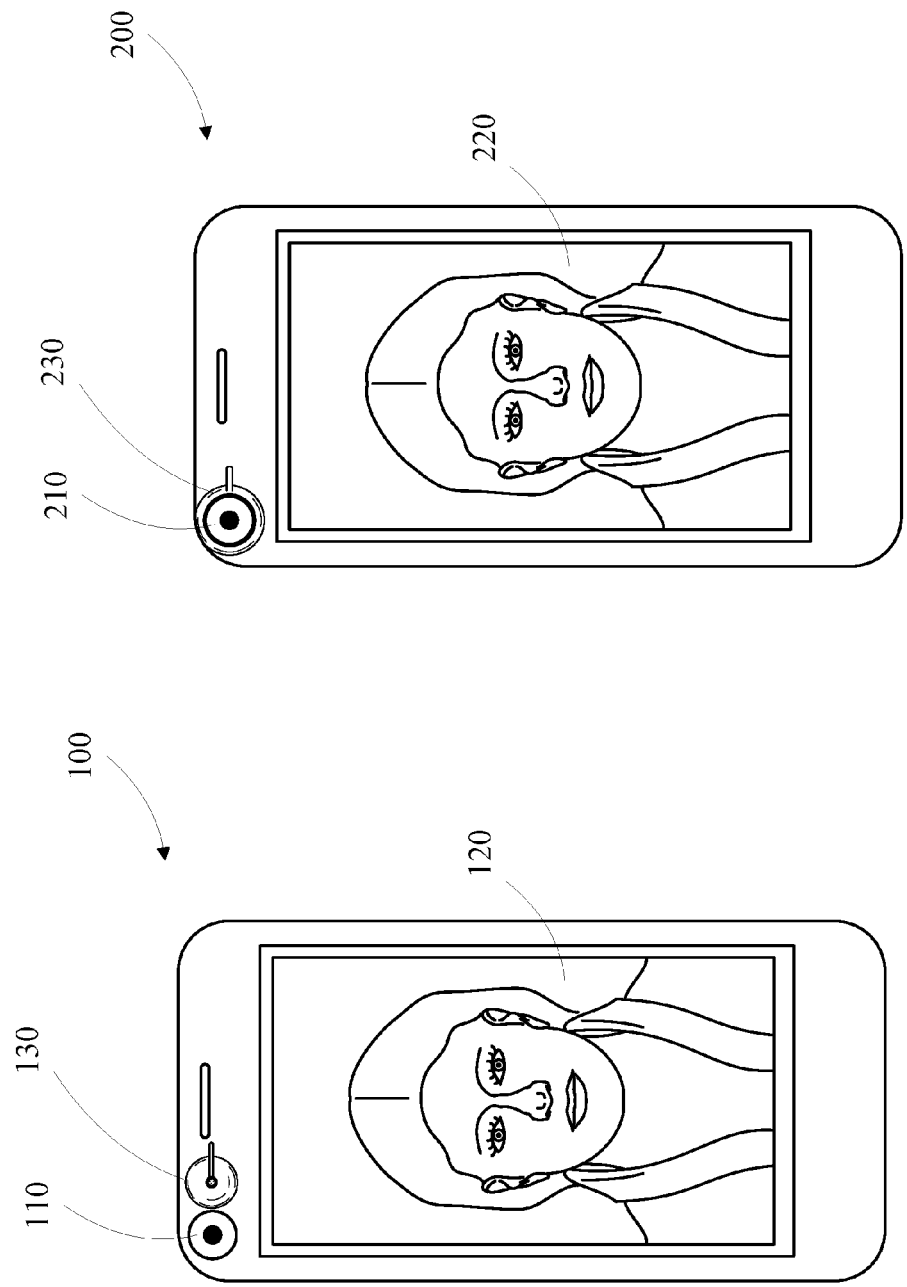

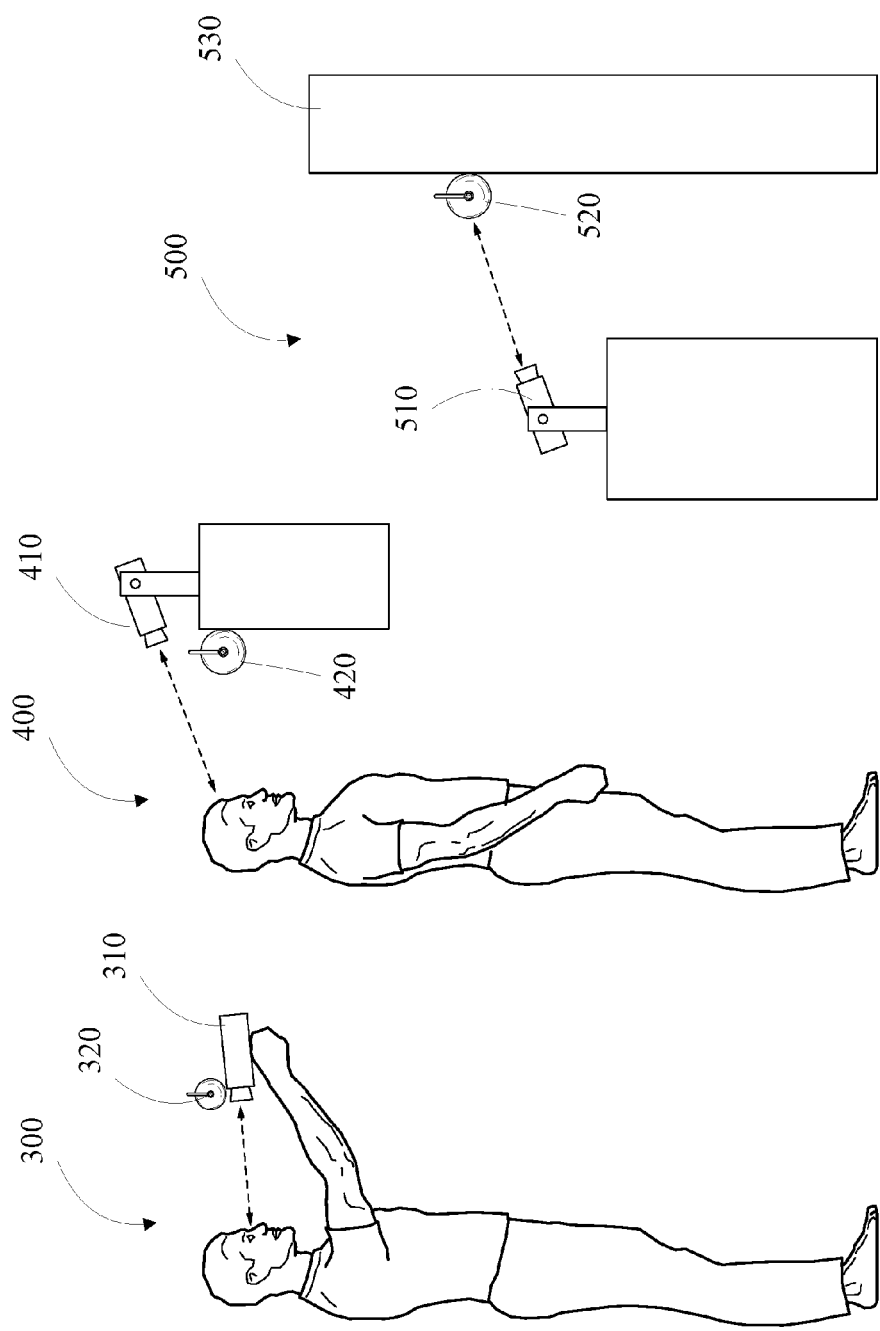

HOLOGRAM FOR ALIGNMENT

BACKGROUND

Alignment of objects may be required in many situations. For example, in taking photos for passports, an individual's head must be positioned properly relative to the camera. Further, in many robotic manufacturing or processing applications, for example, an object may be needed to be aligned with respect to another object or to a machine with a specific orientation, such as may be required in the case of a robot moving within an automated warehouse.

BRIEF DESCRIPTION OF THE DRAWINGS

For a more complete understanding of various examples, reference is now made to the following description taken in connection with the accompanying drawings in which:

FIG. 1 illustrates a camera device with an example hologram device;

FIG. 2 illustrates a camera device with another example hologram device;

FIG. 3 illustrates an example of a user with a camera having an example hologram device;

FIG. 4 illustrates an example of a user using a camera system with an example hologram device;

FIG. 5 illustrates a system with an object having an example hologram device for alignment with a camera;

DETAILED DESCRIPTION

Figure 6:
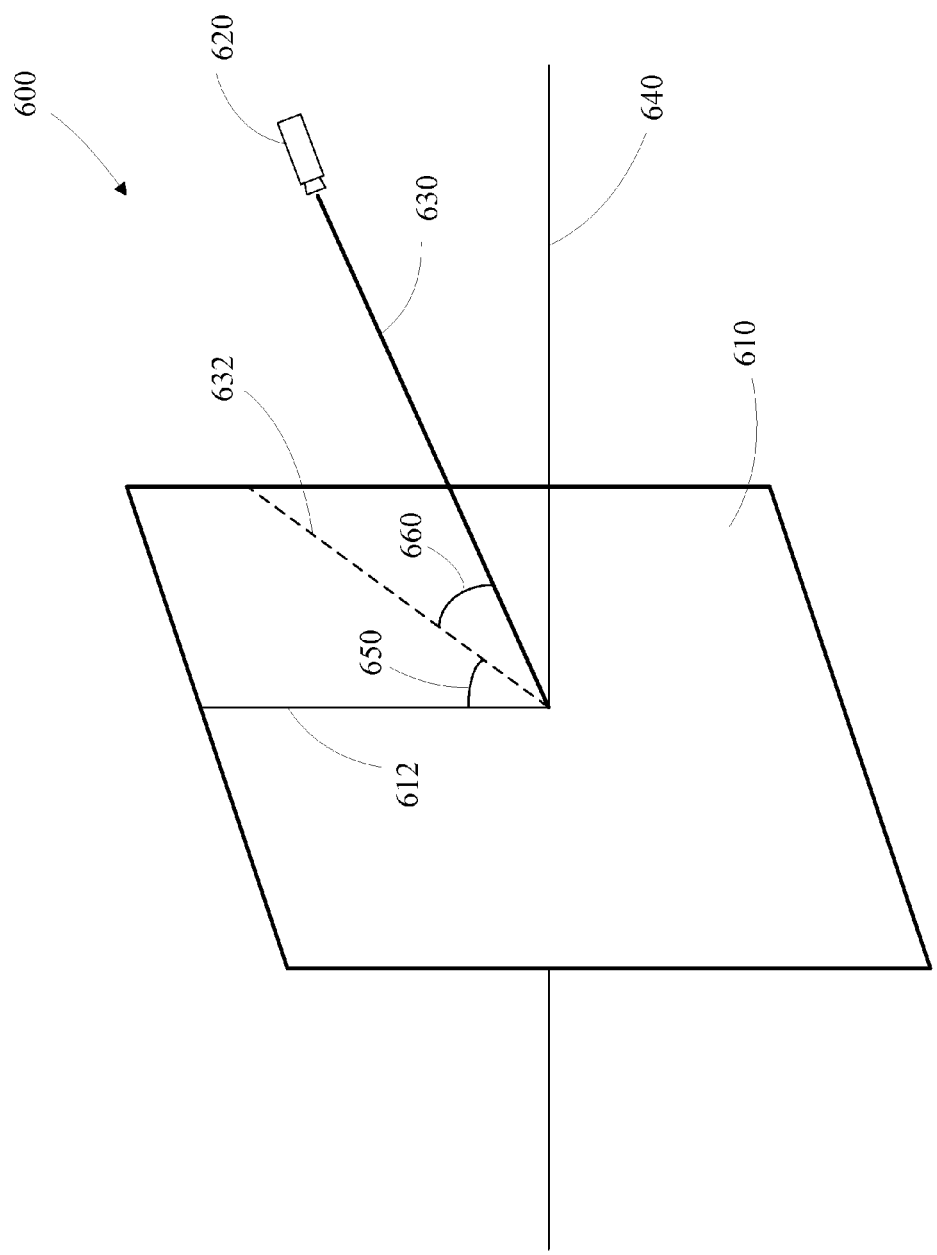
FIG. 6 provides a schematic illustration of an example position identification system.

In various examples described herein, a hologram device is used to facilitate alignment. The hologram device may include an encoded holographic image which may have different views when viewed from various positions. Each view of the encoded image may be indicative of a position relative to alignment with a target position. The target position may be associated with a target holographic view on the encoded holographic image of the hologram device.

In various examples, a hologram device may include conventional holograms. In other examples, the hologram device may include a multi-view, three-dimensional display. The multi-view, three-dimensional display may be formed may reproduce light rays reflecting off an object from various angles to get a different image from different perspectives, such as the different eyes of a human viewer or an imaging device positioned at different positions relative to the hologram device. In one example, the multi-view, three-dimensional display may use non-patterned grooves to send light off in different directions.

FIG. 1 illustrates a camera device with an example hologram device. The illustrated camera device 100 may be mobile phone or a digital camera. The camera device 100 includes a camera 110, such as a front-facing camera on smartphone. The camera device 100 also includes a display 120 which provides the image seen through the camera 110.

Often, an individual taking one's own picture looks at the screen to ensure proper alignment. This results in an image of the user with eyes drooping downward since the user is not looking into the camera. In the illustrated example, the camera device 100 is provided with a hologram device 130 in the vicinity of the camera 110. The hologram device 130 provides the user with an alignment mechanism to allow the user to look closer to the camera 110. Various examples of the hologram device 130 are described below with reference to FIGS. 6-9.

FIG. 2 illustrates a camera device with another example hologram device. The camera device 200 of FIG. 2 is similar to the camera device 100 of FIG. 1 and includes a camera 210, a display 220 and a hologram device 230. The hologram device 230 is formed with an annular configuration and is positioned around the camera device 210.

In the examples of FIGS. 1 and 2, the user may be allowed to look into the camera or close to the camera, rather than at the display screen. The hologram device may provide the user with an indication of proper alignment with the camera. Examples of the hologram device are described in greater detail below. Thus, the user is able to take a more desirable self-portrait.

FIG. 3 illustrates an example of a system 300 including a user with a camera 310 having an example hologram device 320. It is noted that, while the hologram device 320 is a flat device which may be, but does not need to be, positioned parallel to the lens, FIG. 3 illustrates the hologram device 320 schematically for purposes of clarity. As described above with reference to FIGS. 1 and 2, the hologram device 320 allows the user to properly align the camera to photograph himself without the use of a display. For example, the user may move the camera to achieve proper alignment using the hologram device 320. Thus, with proper alignment, the camera is pointed at the eyes of the user with the user looking into the lens of the camera. The user's head may be properly framed and rotationally aligned as well.

In other examples, as illustrated in FIG. 4, a hologram device 420 may be used to properly position the user relative to a camera 410. Thus, the user may move and use the hologram device to properly position himself. For example, in the case of passport photos or other specialty photos or medical imaging, the user may be required to position himself in a particular manner relative to the camera or image capture device.

Referring now to FIG. 5, a system 500 using a hologram for alignment is illustrated. In the system 500 of FIG. 5, a camera 510 may use a hologram device 520 on an object 530 to properly align the object. For example, the camera 510 may be associated with a robotic processor which requires the object 530 to be in a particular position and/or orientation for processing. The hologram 520 may indicate the current position of the object 530. A mechanism (not shown) may be provided to change the alignment or orientation of the object 530 based on the viewing of the hologram device 520 by the camera 510. In one example, the cameral 510 may be mounted on a vehicle, and the hologram device 520 may be used to facilitate automated parking of the vehicle in, for example, a self-driving mode. For example, the vehicle may be a robot-driven vehicle.

FIG. 6 provides a schematic illustration of an example position identification system. In the example system 600, a hologram device 610 is used for alignment of a visual device, such as a camera 620. In other examples, the visual device may be a human eye or any other imaging device. In the illustration of FIG. 6, the line of sight between the camera 620 and a target point (e.g., the center point of the hologram device) is shown as reference numeral 630, and reference numeral 632 represents the projection of the line of sight onto the hologram device 610. The position of the camera 620 relative to the target can be represented as two angular measurements. The first angle 650 is the azimuth, measured as the angle between a reference direction in the plane of the hologram device, such as the reference line 612, and the projection of the line of sight onto the hologram device 632. The second angle 660 is the elevation from the plane of the hologram device 610 and the line of sight 630. Of course, the position may be represented in a variety of other manners which are considered within the scope of the present disclosure.

Figure 7:
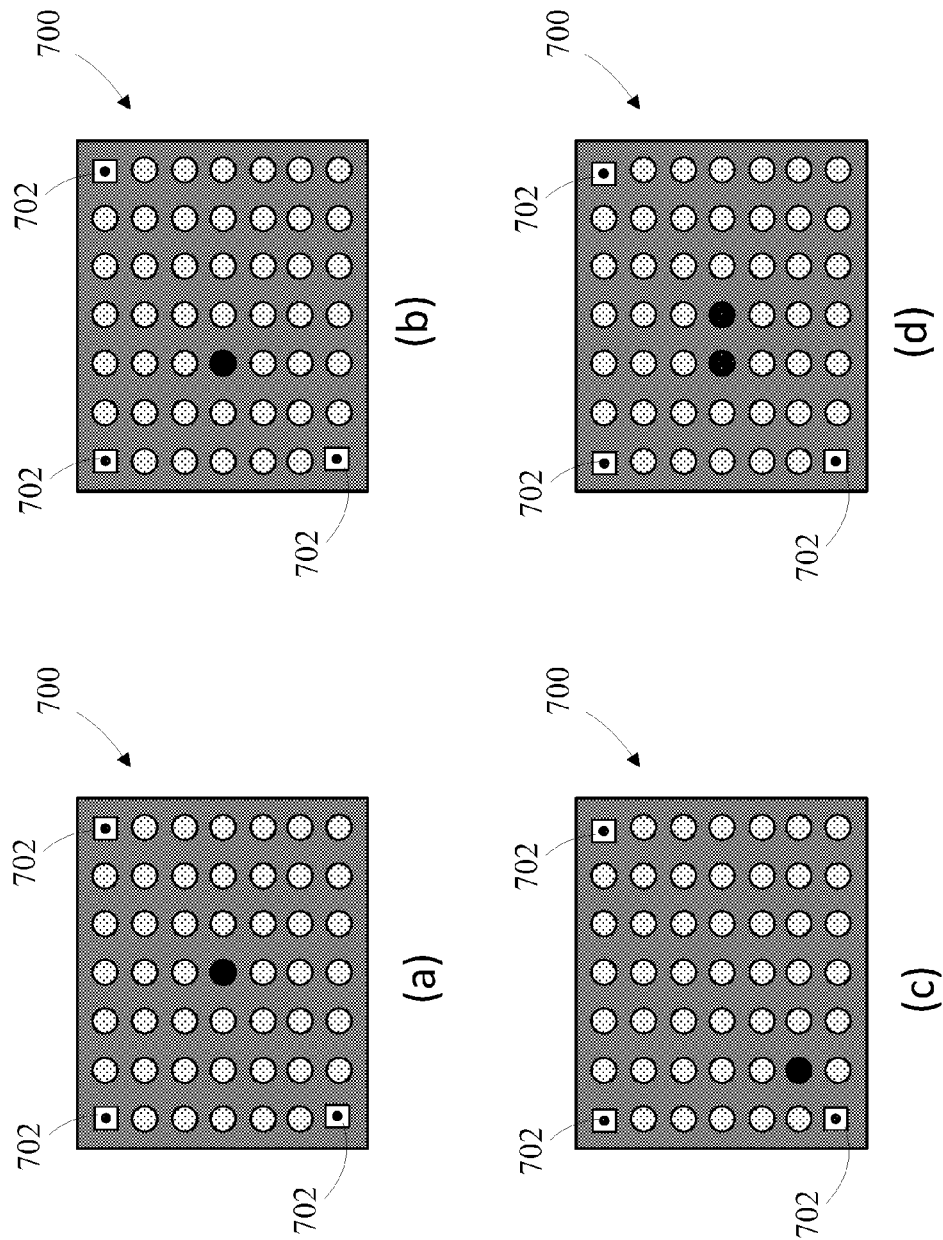
FIG. 7 illustrates an example hologram device viewed from various positions.

FIG. 7 illustrates an example hologram device viewed from various positions. The example hologram device 700 may include an encoded image of a matrix of dots. The example hologram device 700 may also include features 702 for facilitating orientation, or detecting the orientation, of the hologram device. When viewed from different positions, different views of the encoded image may be indicative of the viewer's position relative to a target. In this regard, the target may be the normal line-of-sight from the flat hologram device 700 extending through the center of the hologram device 700. FIG. 7 shows a progression of views of the hologram device 700 illustrating how angular information can be transmitted optically to a viewer or an imaging device such as a camera. When the hologram device is viewed from a target position, such as from directly above the hologram device 700 (as shown in FIG. 7(a)), a target dot in the matrix of dots may appear differently from the other dots. In some examples, the target dot may appear brighter, darker, or a different color, for example. The change in appearance may facilitate identification of the target position.

If the observer is positioned such that the line of sight is, for example, ten degrees from the normal in one dimension, the hologram device 700 may appear as illustrated in FIG. 7(b). FIG. 7(c) illustrates the hologram device 700 as it may appear when viewed with the line of sight 20 degrees from normal in one dimension and 20 degrees from normal in the second direction. Finally, FIG. 7(d) illustrates the hologram device 700 as it may appear when viewed from an angle of five degrees from the normal in one dimension. In this regard, two adjacent dots may appear as different from the other dots in the matrix.

Figure 8:
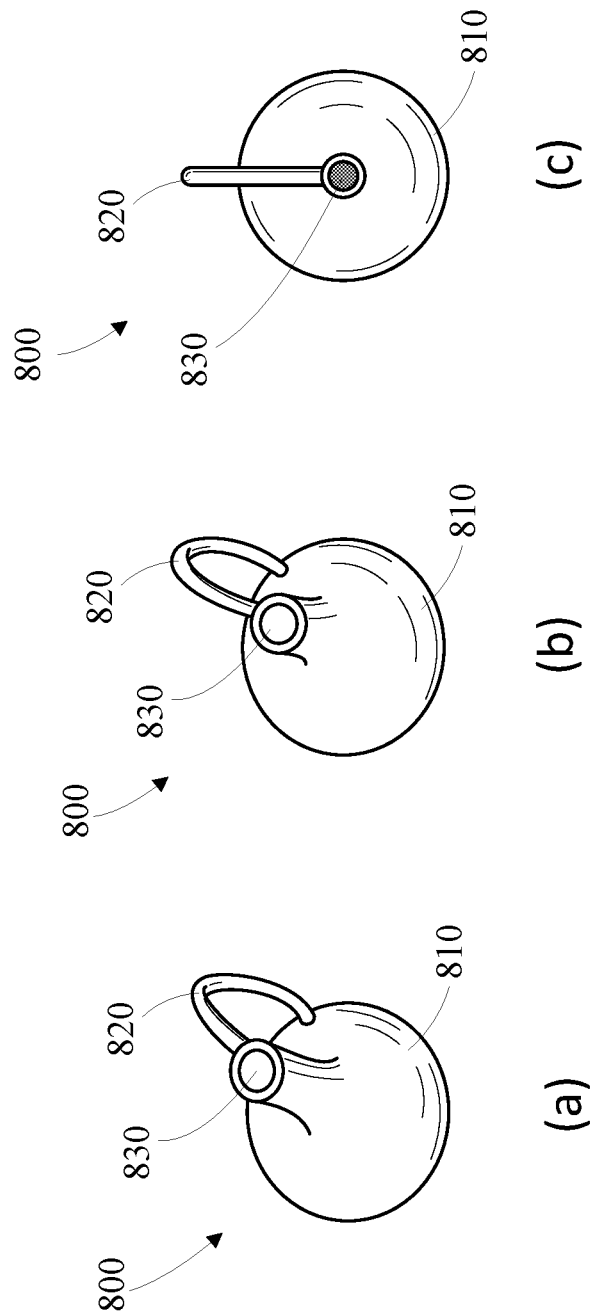
FIG. 8 illustrates various views of an example three-dimensional object for encoding on a holographic device.

In some examples, the hologram device may be encoded with an image of a three-dimensional object. Such an object may allow visual alignment through viewing of an orientation of the three-dimensional object. The orientation of the object may allow determination of the change in position needed for proper alignment. In certain examples, the three-dimensional object may include an asymmetric feature which may facilitate rotational alignment. One example of a three-dimensional object having an asymmetric feature is illustrated in FIG. 8, which includes various views of the example three-dimensional object. An image of the three-dimensional object, equivalent to a set of two-dimensional images, may be encoded as a hologram on a hologram device.

The example object of FIG. 8 is a vase 800 having a body 810, a handle 820 and an opening 830. In the illustrated example, the target alignment of the vase may be with the user looking into the opening 830 toward the bottom of the inside of the vase 800. When the hologram object is viewed from positions other than the target alignment, the vase 800 may be viewed from an off-center perspective, as illustrated in FIGS. 8(a) and 8(b). As illustrated in FIG. 8(c), when properly aligned, the opening 830 of the vase 800 may change in appearance. For example, in FIG. 8(c), the opening is made darker. In other examples, the opening may be brighter, a different color or otherwise change visually.

As noted above, the three-dimensional object may include an asymmetric feature to allow proper rotational alignment. In the example of FIG. 8, the handle 820 of the vase 800 provides the asymmetric feature. Proper rotational alignment is achieved when the handle 820 appears in a particular position, such as on the top side of the vase, as illustrated in FIG. 8(c).

FIGS. 9A-9D illustrate example holographic images for encoding on hologram devices. In various examples, the encoded image may be sphere formed of facets, similar to a mirror ball. Each facet may include an indication of a position of the facet, for example, relative to a target facet. Thus, a view of the encoded image may correspond to one or more facets of the spherical encoded image. In different examples, the position of each facet may be indicated in different manners. FIGS. 9A-9D illustrate some such examples.

Figure 9A:
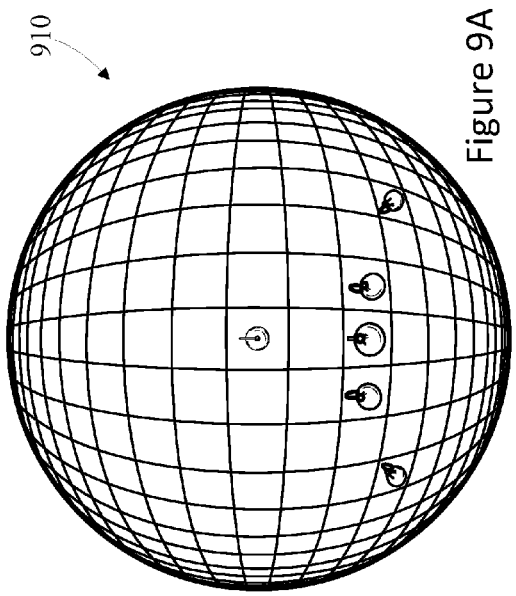
FIGS. 9A-9D illustrate example holographic images for encoding on hologram devices.

Referring first to FIG. 9A, each view of the encoded image may include a view of a three-dimensional object, such as the object described above with reference to FIG. 8. In this regard, each facet of the spherical object may include an image of the three-dimensional object from a different perspective. Each different perspective may be indicative of the position of the corresponding view or facet relative to a target view or perspective.

Figure 9B:
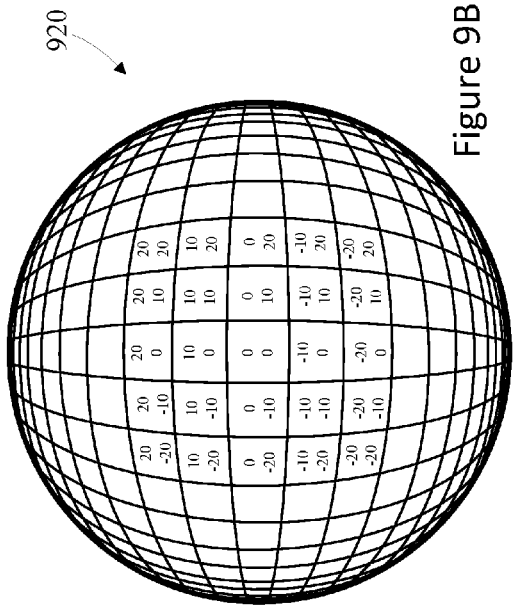

Referring now to FIG. 9B, each view of the encoded image may include numerical values indicative of the angular position of the view relative to a target view. For example, the values may be indicative of an azimuth value and an elevation angle, such as the angles described above with reference to FIG. 6. Thus, a user or a camera viewing each view may learn the position change required to align with a target view or facet.

Figure 9C:
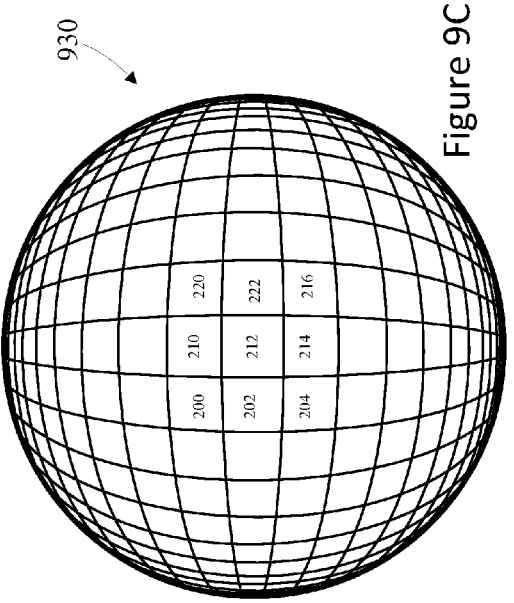

Referring now to FIG. 9C, each view of the encoded image may include a code indicative of the position of each view relative to a target view. As illustrated in FIG. 9C, the code may be a numerical value. The numerical values may be associated with a relative position through a table look-up, for example. In other examples, in place of the numerical values, each view or facet may include another machine-readable code, such as a bar code, a quick-read (QR) code or a 2-dimensional bar code. In various examples, an imaging device may be coupled to a processor. The imaging device may capture the machine-readable code, and the processor may determine the change in position required for alignment with a target view or facet. The processor may cause a change in the position based on the relative position indicated by the machine-readable code.

Figure 9D:
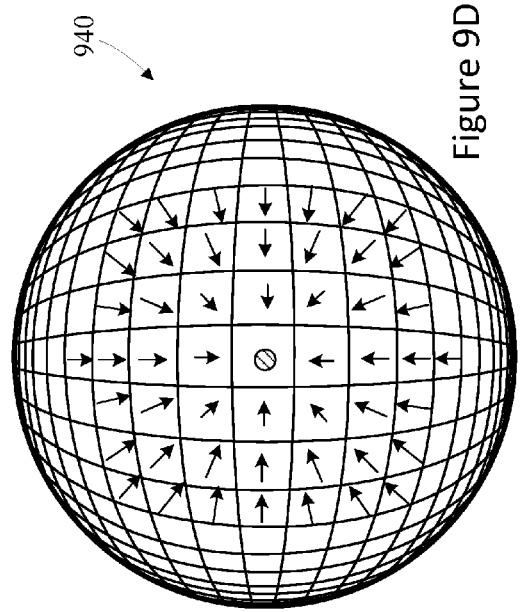

Referring now to FIG. 9D, each view of the encoded image may include a graphical image indicating a target view or a direction to the target view. As illustrated in FIG. 9D, a target view or facet may be indicated by a target symbol, and non-target views or facets may be indicated by an arrow indicating the direction to the target. In some examples, a feature of the arrow may indicate the magnitude of change required for alignment with the target. For example, a length, thickness or brightness of the arrow may indicate a distance to the target view.

Software implementations of various examples can be accomplished with standard programming techniques with rule-based logic and other logic to accomplish various database searching steps or processes, correlation steps or processes, comparison steps or processes and decision steps or processes.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

What is claimed is:

1. A hologram device, comprising:
   a target holographic view of an encoded holographic image representing an alignment target; and
   a plurality of non-target holographic views of the encoded holographic image, each non-target holographic view indicating a position relative to the target holographic view.

2. The device of claim 1, wherein the encoded holographic image includes a three-dimensional object.

3. The device of claim 2, wherein the three-dimensional object includes an asymmetric feature to facilitate rotational alignment.

4. The device of claim 1, wherein each non-target holographic view of the encoded holographic image includes a code associated with the position relative to the target holographic view.

5. The device of claim 4, wherein the code is a machine-readable code.

6. The device of claim 4, wherein the code is associated with the position relative to the target holographic view through a table look-up.

7. The device of claim 1, wherein each non-target holographic view of the encoded holographic image includes a first angle indicative of an elevation angle and a second angle indicative of an azimuth value.

8. The device of claim 1, wherein each non-target holographic view of the encoded holographic image includes a graphical representation indicative of the position relative to the target holographic view.

9. A method, comprising:
   detecting a non-target holographic view of an encoded holographic image on a hologram device, the non-target holographic view indicating a position relative to a target holographic view of the encoded holographic image;
   causing a change in the position relative to the target holographic view based on the non-target holographic view indicating the position relative to the target holographic view.

10. The method of claim 9, wherein the encoded holographic image includes an image of a three-dimensional object.

11. The method of claim 10, wherein the three-dimensional object includes an asymmetric feature indicating a rotational orientation of the hologram device, and wherein the method further comprises:
    causing a rotation to change the rotational orientation of the hologram device based on the indication of the orientation by the asymmetric feature of the three-dimensional object.

12. The method of claim 9, wherein the non-target holographic view of the encoded holographic image includes a machine-readable code associated with the position relative to the target holographic view.

13. A system, comprising:
    a hologram device associated with an object, the hologram device including a plurality of non-target holographic views of an encoded holographic image, each non-target holographic view including a machine-readable code indicating a position relative to a target holographic view;
    an imaging device to read the machine-readable code of at least one of the non-target holographic views; and
    a processor for determining an alignment position of the object relative to the imaging device based on the machine readable code encoded on the at least one of the non-target holographic views.

14. The system of claim 13, wherein the hologram device further includes a target holographic view of the encoded holographic image, the target holographic view representing an alignment target.

15. The system of claim 13, wherein the machine readable code is a bar code, a quick-read (QR) code, or a two-dimensional bar code.

* * * * *